United States Patent [19]

Wenzel

[11] Patent Number: 4,476,610
[45] Date of Patent: Oct. 16, 1984

[54] METHOD AND APPARATUS FOR TRANSVERSELY CUTTING FISH

[75] Inventor: Werner Wenzel, Lübeck, Fed. Rep. of Germany

[73] Assignee: Nordischer Maschinenbau Rud. Baader GmbH and Co. KG, Lübeck, Fed. Rep. of Germany

[21] Appl. No.: 420,795

[22] Filed: Sep. 21, 1982

[30] Foreign Application Priority Data

Sep. 24, 1981 [DE] Fed. Rep. of Germany ....... 3138012

[51] Int. Cl.³ ............................................. A22C 25/18
[52] U.S. Cl. ......................................... 17/55; 17/52; 17/61; 17/63
[58] Field of Search ......................... 17/52, 55, 61, 63; 83/411 R, 733

[56] References Cited

U.S. PATENT DOCUMENTS

| 2,245,329 | 6/1941 | Danielson | 17/52 |
| 2,803,035 | 8/1957 | Bartels et al. | 17/63 |
| 2,835,918 | 5/1958 | Schlichting | 17/63 |

FOREIGN PATENT DOCUMENTS

| 143391 | 8/1980 | Fed. Rep. of Germany | 17/61 |
| 618463 | 2/1949 | United Kingdom | 17/61 |
| 505070 | 5/1949 | United Kingdom | 17/63 |

Primary Examiner—Nicholas P. Godici
Assistant Examiner—Kurt Rowan
Attorney, Agent, or Firm—Edward F. Levy

[57] ABSTRACT

In a method for manufacturing fish tail pieces of the same length a fish conveyed transverse to its longitudinal axis in conveying troughs is displaced in the conveying troughs by a pulling engagement of its tail fin and is transversely cut after reaching the desired position. The device for carrying out this method comprises a gripping device in the form of a circular disc with a number of pincers which run with the trough conveyor and clampingly seize the tail fins. The diverging movement of the pincers which, due to the circular path, diverges from the conveying direction of the trough conveyor effects the displacement of the fish, this displacement being ended by the severing of the tail fin by means of a circular knife whose position can be adjusted.

7 Claims, 3 Drawing Figures

METHOD AND APPARATUS FOR TRANSVERSELY CUTTING FISH

BACKGROUND OF THE INVENTION

1. Field of the Invention

The invention concerns a method for the mechanical production of pieces of the same length of fish conveyed transverse to their longitudinal axis as well as an apparatus for carrying out such a method, this apparatus comprising a trough conveyor which conveys the fish transverse to their longitudinal axis and at least one cutting means which overlaps at least the cross-sectional area of fish placed in the conveying troughs, the apparatus further comprising a displacing device for displacing fish tail first and an abutting device for limiting the displacement of the fish by catching the same by their tail roots.

2. Description of Prior Art

Such fish pieces which are preferably produced from sardines, herrings, anchovies etc. are needed essentially as a filler for tins. They are offered to the consumer prepared in different ways. The tail pieces are usually preferred since especially in single reciprocal layers of such pieces a more profitable rate of feeding and a product which is more pleasing to the eye are achieved. Problems arise in trying to fulfil the quality demands in this respect as well as with regard to the weight tolerance, which problems are mainly due to the fact that the fish to be processed are of different lengths and maturity. The usual practice of putting a uniform number of pieces—for example four—into tins, requires a pre-sorting into several classes of small size and thickness tolerance due to differences in size and thickness. The device for cutting the pieces thus has to be adjustable to each necessary piece length. This is extremely difficult to achieve with the machines known so far so that these machines and the methods practised therewith are not satisfactory.

A piece cutting device is known (e.g. U.S. Pat. No. 2,431,465) in which the fish are conveyed in the troughs of a trough conveyor transverse to their longitudinal axis. The upwardly extending walls of the troughs are provided with slots extending to under their bottom surface, at least one circular knife arranged above the trough conveyor entering into them. In order to sufficiently support the fish the slots lie at such a distance from each other that leftovers of the peripheries remain between the slots. Apart from the fact that only pieces of the same length—regarding the plane of decapitating—can be manufactured, the tail piece being the remnant, the shifting of the knife in order to achieve a different length for the pieces is very complicated and only possible in relatively rough gradation.

There is further known (DE-PS No. 717 592) a device for the production of so-called "fork-size bites" whereby the fish not yet decapitated are inserted, after their tail fin has been removed, with their head facing the centre into a circular conveyor with partitions consisting of ridges running above a circular table. The circular table has openings. After being aligned with their snouts in the same position by means of a guide the fish fall through the openings into a set of pairs of disc knives which shear with each other and carry out the transverse severing. The disadvantages laid down in connection with the first-mentioned cutting device are also found here. However, a more delicate adjustment of the desired piece lengths is possible.

Furthermore, a piece cutting or slicing device is known (DE-PS No. 26 44 024) in which the head end of the fish forms the remnant piece. The fish rumps lying in the receiving troughs are, for this purpose, pushed in the direction of their tail end under a measuring bar which forms an abutment supporting itself on the flank of the fish. Thus positioned, the fish rumps are led to a fixed circular knife which cuts off tail pieces of almost the same weight but differing lengths. Such fish pieces facilitate the compilation of a certain filler weight but make a reasonable positioning in the tins impossible.

3. Object of the Invention

It is therefore an essential object of the present invention to show a way of manufacturing fish tail pieces of the same length which makes a continuous adjustment of the lengths of these pieces in a simple manner possible.

SUMMARY OF THE INVENTION

This object is solved according to the invention by a method in which the fish are conveyed transverse to their longitudinal axis and which comprises the steps of aligning the fish according to the position of their tail root, displacing the fish by a pulling engagement or gripping in the region of their tail fins, ending the displacement of the fish by interrupting the pulling engagement and separating the tail piece by means of a cut led transverse through the fish rump. The ending of the displacement of the fish resulting from the pulling engagement, i.e. its positioning for the separating cut which follows can occur by cutting off the tail fin or interrupting the pulling grip in the region of the tail fin according to whether the fish pieces are desired with or without their tail fins.

Preferably a holding device for gripping the fish in the region of its tail is provided next to a tail side end of the conveying troughs in an apparatus as described in the introductory paragraph to carry out the method according to the invention, which holding device carries out an accompanying movement which is almost synchronous with the conveying speed of the trough conveyor and which diverges in respect of the conveying direction of the trough conveyor and is adjustable in connection with the position of its engagement resp. its release.

The advantages achieved with the invention lie especially in that the length of the pieces can be adjusted precisely and easily in order to achieve an optimal degree of filling of the tins as well as an aesthetically pleasing filling.

A functionally safe embodiment which is also simple to manufacture comprises a holding device including pincers which run in the plane of the bottom surfaces of the conveying troughs in a circular path and are adjustable with regard to their position of operation, i.e. their opening or closing places, which pincers are arranged in a partition which corresponds to the partition of the conveying troughs in the conveyor.

In order to produce pieces of fish without tail fin the apparatus according to the invention can have a device for separating the tail fin, which device comprises a circular knife tangentially touching the circular path of the pincers.

It is advantageous to provide the circular knife to be adjustable with regard to its angle to the conveying direction of the trough conveyor in order to be able to set, in a simple manner, the amount of displacement of the fish in the conveying troughs, i.e. the length of the fish pieces to be produced from the transverse cut which follows.

In order to further reduce construction costs the pincers can each comprise a moveable leg which can be held pressed under the force of a spring against a circular disc which carries the pincers resp. their legs.

For the sake of ensuring a safe grip the surface of the circular disc facing the legs of the pincers may comprise a well gripping and/or elastic covering, i.e. a top covering which guarantees a reliable conveying.

BRIEF DESCRIPTION OF THE DRAWINGS

Other and further objects of the present invention will be apparent from the following description and claims and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims.

The invention is described as follows with reference to the drawings.

DETAILED DESCRIPTION OF THE PREFERRED EMBODIMENT

Figure 1:
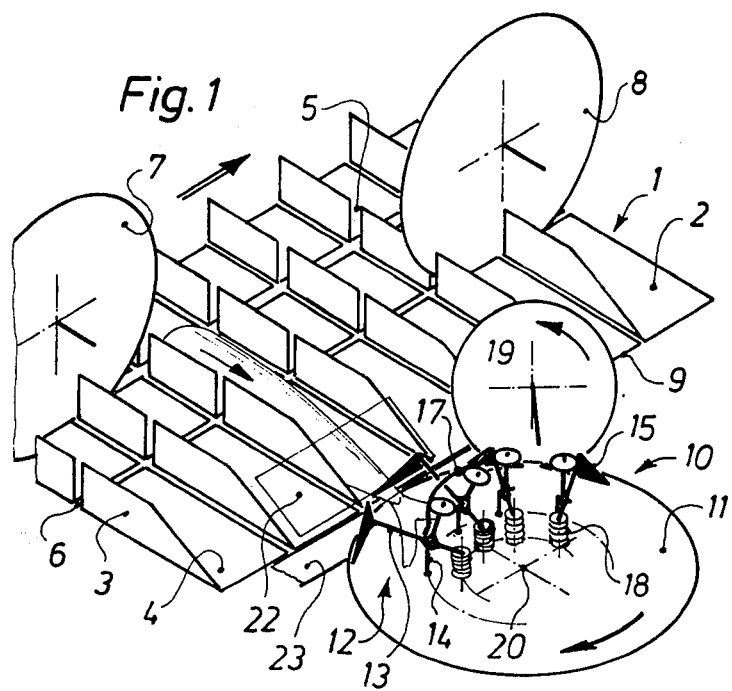
FIG. 1 shows an axonometrical view of an essential part of the device according to the invention.

A trough conveyor 1 running endlessly in a conveying direction indicated by the double line arrow in FIG. 1 is arranged in a not-shown machine frame, e.g. of a nobbing machine for small bulk fish, the conveyor having conveying troughs 2 arranged closely behind each other and transverse to the conveying direction. The troughs 2 are e.g. angular in cross-section, a wall 3 extending upward as well as a bottom surface 4 of the troughs 2 being provided with slots 5 and 6 at defined positions into which circular knives 7, 8 which form a decapitation knife and a slicer enter and are mounted to turn in bearings above the trough conveyor 1. A plate-like gripping device is mounted proximate to the front end 9 of the troughs and comprises a circular disc 11 upon which is mounted a circular array of spaced pincer members 12. The circular disc 11 is located in the plane of the bottom surface 4 of the troughs 2 and is mounted at its center upon an axle 20 (FIG. 2) for rotation about an axis substantially perpendicular to the conveying plane of the conveying troughs 2. The axle 20 is rotatable by conventional drive means (not shown) for rotation of the circular disc 11 in a clockwise direction, indicated by the arrow in FIG. 1, at a circumferential speed of rotation corresponding to the speed of progression of the conveying troughs 2, which move in a right-hand direction as viewed in FIG. 1. The top surface of disc 11 is covered with an elastomer or is otherwise made to grip easily in an appropriate manner.

Figure 2:
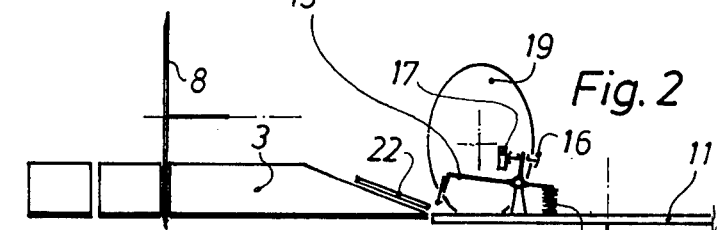
FIG. 2 shows a partial cross-section of the device of FIG. 1 in the moment when the tail fin of the fish is led into the holding apparatus.
Figure 3:
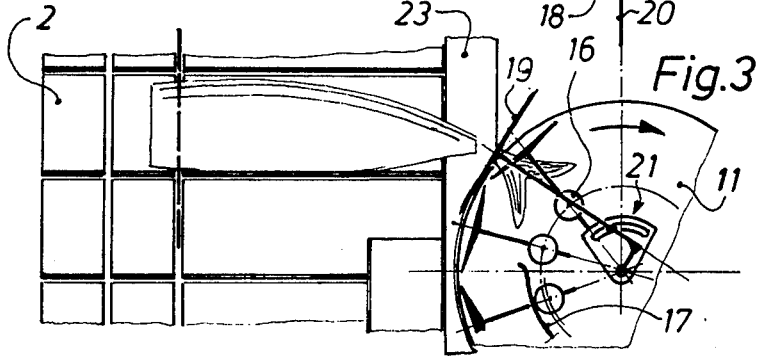
FIG. 3 shows a top view of the device in working position shortly after the tail fin has been severed.

The pincer members 12 are mounted on the top surface of the circular disc 11 and each comprises a moveable leg 13 mounted pivotably on a support bearing 14 and formed as an angle lever which extends radially of the disc 11. The pivotal axis of each leg 13 extends substantially parallel to the plane of disc 11 and perpendicularly to an imaginary circle shown in broken line in FIG. 3, which circle is concentric with the circumference of circular disc 11. A gripping shoe 15 is affixed to one end of each leg 13 and depends therefrom at an angle toward the top surface of circular disc 11 and thus faces the latter with its bottom gripping edge as shown in FIG. 2. Intermediate its ends, preferably above its pivotal mount as shown in FIGS. 1 and 2, each leg has an upstanding extension upon which is rotatably mounted a roller 16 which is positioned to engage and bear against an elongated arcuate cam 17, as shown in FIG. 3. The cam 17 is fixedly mounted above disc 11 and is sized and configured to extend substantially concentric with disc 11 over a sector of said disc at the area immediately upstream of the point at which the circumference of the disc 11 is closest to the front edge 9 of troughs 2, as shown in FIG. 1. The cam 17 ends approximately at this point of closest adjacency, as shown in FIG. 3.

As shown in FIGS. 1 and 3, the pincer members 12 are spaced around the circular disc 11 at such distances that, as the disc 11 rotates in synchronization with the travel of trough conveyor 1, each successive pincer member, as it approaches the said point of closest adjacency, comes into registry with, and faces one of the troughs 2, so that it can grip the tail end of the fish projecting from said trough after the pincer member moves out of engagement with the cam 17, in a manner to be presently described.

The end of each movable leg 13, opposite to the gripping shoe 15, is biased upwardly by a spring 18 bearing against the upper surface of the disc 11, so that when the support roller 16 is out of engagement with cam 17, the gripping shoe 15 is resiliently pressed against the top surface of circular disc 11 by means of spring 18. When the support roller 16 is in engagement with cam 17, however, the cam holds the leg 13 in the upwardly inclined position of FIG. 2, against the tension of spring 18, in which inclined position the gripping shoe 15 is elevated above the surface of the disc 11.

A circular knife 19 is rotatably mounted on the machine frame substantially tangentially to the periphery of the circular disc 11 at a position downstream of the trailing end of cam 17, as shown in FIG. 3. The knife 19 is positioned to cut off the tail fins of the fish gripped by the pincers 12, and in this cutting operation touches the path of rotation of the circular disc 11 and performs a shearing action with the periphery of said circular disc. The cutting plane of the knife 19 is adjustable with respect to its position along the conveying direction of the trough conveyor 1. For this purpose, a bearing housing upstands from the axis 20, as shown in FIG. 3 and mounts the end of the drive rod carrying the circular knife 19. The knife 19 is therefore adjustably rotatable about the axis 20 so as to selectively move the knife 19 tangentially along the circumference of circular disc 11 toward or away from the point of closest adjacency between disc 11 and the troughs 2. The knife 19 may then be locked in adjusted position by means of a clamping device 21. The circular knife 19 is driven by suitable drive means (not shown), for example through the axis 20 by means of a suitable angular gear, in which case the axis 20 and its bearing housing would be made hollow.

The walls 3 of the conveying troughs 2 are designed with edges sloping down towards the end 9 of the conveying trough 2 so that a stop rail 22 arranged fixed to the frame above this end leaves a wedge-shaped aperture with the bottom surface 4 of the conveying troughs 2 to let the tail fin of the fish pass.

In order to span the space between the bottom surfaces 4 of the conveying troughs 2 and the circular disc 11 a support rail 23 which is adapted to the periphery of the circular disc 11 is installed.

The mode of operation and function of the device shown as an embodiment of the invention are described with reference to the handling of a fish:

A fish which is fed into the conveying troughs 2 and decapitated by decapitation knife 8 in a known manner after being aligned into the desired beheading position, is first displaced longitudinally in the tail direction as shown by the arrow in FIG. 1 in the respective conveying trough 2 by means of a not-shown brush or any other appropriate means. The tail end of the fish arrives under the stop rail 22, the tail fin passing through the aperture left between the stop rail 22 and the bottom surface 4 and coming to rest on the circular disc 11. The longitudinal displacement of the fish is ended when the tail root which is thicker than the tail fin abuts the stop rail 22. The pincer 12 opposite the preceding conveying trough 2 is open, with its gripping shoe elevated, until this moment due to the fact that its support roller 16 supports itself on the cam 17. While the trough conveyor 1 advances, and the circular disc 11 turns correspondingly the support roller 16 runs off from the cam 17 so that the gripping shoe 15 of the pincer 12 lowers and presses the tail fin lying beneath it against the circular disc 11 by the force of the spring 18 and therefore clamps it. The fish has in the meantime left the area of the stop rail 22 and is thus freed to be displaced longitudinally in the conveying trough 2 because the distance between the pincer 12 holding the fish and the end 9 of the conveying trough 2 is increasing. As shown in FIG. 3, as the circular disc 11 continues to turn in synchronization with the moving trough conveyor 1 the gripping pincer member 12 is moved away from the point of closest adjacency, and the distance between said pincer member and the adjacent trough 2 continuously increases. This results in the pincer member 12 effecting a pulling action upon the fish tail which it is gripping, thereby causing the fish to be drawn longitudinally forward in its trough toward the circular disc 11. This process continues until the circular knife 19 is reached which cuts off the tail fin with a cut running in the vicinity of the clamping position of the pincer 12, thereby freeing the fish from the gripping shoe 15 and ending the displacement of the fish in the conveying trough 2. The fish is led to the circular knife 8 of the slicer in the position thus achieved. The knife separates the fish at a position determined in this way. As can be seen, the position of the circular knife 19 is decisive for the lengths of the pieces attainable. The circular knife 19 is therefore arranged coaxially pivotally around the axis 20 of the circular disc 11 and designed lockable by means of the clamping device 21. The severed tail fin is released by returning the pincer 12 into the open position for receiving the tail fin of the next fish, and washed out of the clamping device e.g. by a jet of water.

If pieces of fish with tail fin are desired, the cam 17 can be provided with an extension which reaches into the region of the circular knife 19 against the direction of rotation of the circular disc 11, and the circular knife 19 may be disposed of. The position in which the support rollers engage the cam 17 will then be designed adjustably in an appropriate manner so that the opening point of the pincer 12 can be adjusted.

What is claimed is:

1. A method for mechanically processing fish having a rump defining a longitudinal axis and a tail end including a tail root and a tail fin by producing uniform tail pieces comprising at least part of said tail end, said fish being transported on a conveyor in a conveying direction which is essentially transverse to said longitudinal axis, the process comprising the steps of
   (a) placing said fish in an aligned position on said conveyor according to the position of said tail root,
   (b) displacing said fish longitudinally by a pulling engagement in the region of said tail fin,
   (c) ending said displacement of said fish by severing said tail fin thus interrupting said pulling engagement, and
   (d) severing said tail pieces into uniform pieces by means of a cut transverse through said rump.

2. A method according to claim 1 wherein said ending of said displacement of said fish resulting from said pulling engagement occurs by cutting off said tail fin.

3. An apparatus for mechanically processing fish having a rump defining a longitudinal axis and a tail end including a tail root and a tail fin by producing uniforn tail pieces comprising at least part of said tail end, said apparatus comprising trough conveying means having conveying trough means for conveying said fish transverse to said longitudinal axis in a conveying direction with the tail fins projecting from a tail side end of said conveying trough means, at least one cutting means which covers at least the cross-sectional area of said fish when placed in said conveying trough means, displacing means for displacing said fish with said tail end leading, and further comprising abutting means for limiting said displacement of said fish by catching the same at said tail root, wherein holding means which grip said fish in the region of said tail are provided next to said tail side end of said conveying trough means, said holding means performing an accompanying movement with said trough conveying means, said accompanying movement being substantially synchronous with the speed of said trough conveying means but diverging from said conveying direction, and said holding means further being adjustable with respect to the position and duration of their gripping operation.

4. An apparatus according to claim 3 wherein said conveying trough means have bottom surfaces arranged in a common plane and are arranged within said trough conveying means in a defined partition ratio, and said holding means comprise pincer means rotating along a circular path essentially in said plane of said bottom surfaces of said conveying trough means, said pincer means being adjustable with respect to their operational position by means of a fixedly arranged cam and being arranged in a partition ratio corresponding to that of said conveying trough means.

5. A device according to claim 4, comprising means for severing said tail fin, said severing means comprising circular knife means disposed tangentially to the path of rotation of said pincer means.

6. A device according to claim 5, wherein said circular knife means are adjustable in respect of an angular position with respect to said conveying direction of said trough conveying means.

7. A device according to claim 4, wherein said holding means comprise circular disc means to carry said pincer means, each of said pincer means comprising a moveable leg which is held pressed by the force of a spring against said circular disc means.

* * * * *